(12) United States Patent
Mayhew et al.

(10) Patent No.: US 7,832,949 B2
(45) Date of Patent: Nov. 16, 2010

(54) OPTICAL ELEMENT PARALLAX SCANNING DEVICE

(75) Inventors: Christopher A. Mayhew, Oakton, VA (US); Aron Bacs, Orlando, FL (US); Leo Fernekes, Brooklyn, NY (US)

(73) Assignee: Vision III Imaging, Inc., Vienna, VA (US)

( * ) Notice: Subject to any disclaimer, the term of this patent is extended or adjusted under 35 U.S.C. 154(b) by 313 days.

(21) Appl. No.: 11/547,714

(22) PCT Filed: Apr. 11, 2005
(Under 37 CFR 1.47)

(86) PCT No.: PCT/US2005/012220
§ 371 (c)(1),
(2), (4) Date: Oct. 14, 2008

(87) PCT Pub. No.: WO2005/099409
PCT Pub. Date: Oct. 27, 2005

(65) Prior Publication Data
US 2009/0074398 A1    Mar. 19, 2009

Related U.S. Application Data

(60) Provisional application No. 60/560,588, filed on Apr. 9, 2004.

(51) Int. Cl.
*G03B 9/02* (2006.01)
*G03B 35/00* (2006.01)
(52) U.S. Cl. .................... 396/508; 396/324; 348/42
(58) Field of Classification Search .............. 396/508, 396/324, 505–510, 55; 348/42, 49–50, 264
See application file for complete search history.

(56) References Cited

U.S. PATENT DOCUMENTS

| 3,973,825 | A |   | 8/1976  | Starkweather |
| 4,006,291 | A |   | 2/1977  | Imsand |
| 4,186,991 | A |   | 2/1980  | Koide et al. |
| 5,014,082 | A |   | 5/1991  | Farrington |
| 5,014,126 | A |   | 5/1991  | Pritchard et al. |
| 5,448,322 | A |   | 9/1995  | Bacs, Jr. |
| 5,678,089 | A |   | 10/1997 | Bacs, Jr. et al. |
| 5,699,112 | A |   | 12/1997 | Bacs, Jr. |
| 5,933,664 | A |   | 8/1999  | Bacs, Jr. |
| 5,991,551 | A |   | 11/1999 | Bacs, Jr. et al. |
| 6,123,466 | A | * | 9/2000  | Persson et al. ............ 396/358 |
| 6,324,347 | B1 | * | 11/2001 | Bacs et al. ............... 396/429 |
| 6,449,432 | B1 | * | 9/2002  | Uenaka .................... 396/52 |
| 6,735,003 | B1 |   | 5/2004  | Lyons, Jr. |
| 6,791,769 | B2 | * | 9/2004  | Takeda .................... 359/819 |
| 7,502,553 | B2 | * | 3/2009  | Sato et al. ................ 396/55 |

OTHER PUBLICATIONS

Supplementary European Search Report dated Mar. 6, 2008 for European Patent Application EP 05744483.8 (based on PCT/US2005/012220).
International Search Report dated Sep. 9, 2005 for PCT/US2005/012220.

\* cited by examiner

*Primary Examiner*—Clayton E LaBalle
*Assistant Examiner*—Dennis Hancock
(74) *Attorney, Agent, or Firm*—Finnegan, Henderson, Farabow, Garrett & Dunner, LLP

(57) ABSTRACT

An optical element scanning device (10) includes a base plate (200) and one or more linear actuators (210, 220) operably connected to the base plate. An armature (110) may be pivotably connected to the one or more linear actuators, and an optical element (100) may be operably connected to the armature.

21 Claims, 4 Drawing Sheets

OPTICAL ELEMENT PARALLAX SCANNING DEVICE

RELATED APPLICATIONS

This application claims the benefit of priority of U.S. Provisional Application No. 60/560,588 filed on Apr. 9, 2004, which is incorporated herein by reference.

TECHNICAL FIELD

This invention relates generally to autostereoscopic image display and, more particularly, to parallax scanning. The iris of a camera lens is moved in a parallax scanning pattern through a plurality of disparity positions offset from the optical axis of the camera lens. Images of a scene being photographed, as viewed through the lens aperture in its various disparity positions, may be recorded for subsequent display for providing a three dimensional illusion when viewed autostereoscopically with the unaided eye. The size of the lens aperture, the parallax scanning pattern, and the offset amplitude are adjustable "on the fly" to suit conditions.

The system and methods of the present disclosed embodiments are related to the systems and methods described in U.S. Pat. Nos. 5,991,551, 5,933,664, 5,699,112, 5,678,089, 5,448,322, which are incorporated herein by reference.

BACKGROUND

The last 110 years have seen the development of complex systems for global communication and entertainment using moving images. With the exception of some specialized systems, current imaging technologies record and display these images in only two dimensions. This limitation owes partly to the inability of current standard camera and display technologies to capture and to present the parallax information needed to produce true three-dimensional images.

True three-dimensional image displays can be divided into two main categories, stereoscopic or binocular and autostereoscopic. Stereoscopic techniques (including stereoscopes, polarization, anaglyphic, Pulfrich, and time-multiplexed (shuttering) technologies) require the viewer to use a viewing device, such as polarized glasses. Autostereoscopic techniques, such as holography, lenticular screens, parallax barriers, alternating-pairs and parallax scans produce images in a true three-dimensional illusion without the use of special viewing glasses.

Certain "stereo" techniques have been developed for producing and/or displaying a three-dimensional image. These techniques, however, may not be compatible with unaided broadcast television or standard motion picture projection systems. Rather, to produce the stereo imaging effect, these techniques require special display equipment or special glasses that must be worn by a viewer of the image. These limitations have confined these imaging techniques to highly specialized industrial, military, and novelty applications.

While a standard display cannot present a stereo image without special equipment, it can present an image with enhanced texture and depth. Parallax scanning lens technology can create autostereoscopic moving images with enhanced texture and depth on standard displays without the use of special screens or viewing glasses. Images can be recorded on normal film, video, or digital media using standard industry camera systems. Image enhancement may be accomplished entirely by the lens by parallax scanning during recording of the image or images.

Several systems have been developed to generate autostereoscopic moving images through the presentation of parallax information in the images. For example, autostereoscopic television and motion picture systems have been developed that alternately display views of a scene recorded by two cameras from different points of view. These systems may include two cameras to record horizontally, vertically, or a combination of horizontally and vertically displaced views of a scene. While these autostereoscopic approaches can produce images that provide a three-dimensional illusion when displayed, precision matching of the two cameras is required. Improper alignment of the cameras, lens mismatches in focal length and/or focus, camera chrominance and luminance mismatches, and misplaced convergent points all contribute to image flicker and instability, thereby limiting the commercial applications. Also, these systems required considerable operator skill to continuously adjust disparity, convergence and time-displacement rates of image recordings in the necessary coordinated manner.

To avoid the drawbacks associated with a two-camera autostereoscopic system, autostereoscopic methods and systems using a single camera/single lens have been developed. These single camera autostereoscopic systems can record images that, when displayed, may be perceived by a viewer as three-dimensional. In certain embodiments, these single camera systems record images while undergoing oscillatory parallax scanning motion. This parallax scanning motion can produce recorded images with the parallax information needed to create the perceived three-dimensionality of the images when displayed.

While these traditional, single camera autostereoscopic imaging systems may be effective in producing images that can be perceived in three-dimensions when viewed with the unaided eye, these systems are rather bulky and heavy, relatively complex in construction, and consume a significant amount of power during operation.

Moreover, subsequent systems depended on scanning iris mechanisms that included analog rotation actuators to move the iris leaves in a manner to that created a parallax scan. The size and weight of the actuators limited the number of iris leaves that could be used (e.g., four) to create a parallax scan. A simple four bladed (leaf) iris, however, resulted in a square aperture. This caused scene highlights not to match images recorded using standard "round" iris lenses. As a result, cutting (i.e., switching) between images recorded using standard lenses and parallax scanning lenses would generally appear mismatched and awkward. In addition, the analog actuators lacked the ability for self calibration, error correction or precision control.

SUMMARY OF THE INVENTION

In one aspect of the present disclosure, an optical element scanning device includes a base plate and one or more linear actuators operably connected to the base plate. An armature may be pivotably connected to the one or more linear actuators, and an optical element may be operably connected to the armature.

Another aspect of the present disclosure includes an imaging device. The imaging device includes a housing, at least one lens operably connected to the housing, and an image capture medium configured to receive light conveyed through the at least one lens. An iris may be disposed in the housing of the imaging device at a position that enables the iris to control an amount of the light received by the image capture medium. The iris may be operably connected to an armature that is pivotably connected to a first linear actuator and a second linear actuator. The first and second linear actuators may be configured to move the iris through a range of motion in an X-Y plane.

Yet another aspect of the present disclosure includes a method of capturing an image. The method may include transferring light through at least one lens to an image capture medium, controlling an amount of light received by the image capture medium with one or more optical elements, and scanning the one or more optical elements over a range of motion in an X-Y plane and about an optical axis of the at least one lens. The scanning may be accomplished by providing electrical signals to a first linear actuator and a second actuator to pivot an armature operably connected to the one or more optical elements.

DETAILED DESCRIPTION OF THE DISCLOSED EMBODIMENTS

Figure 1:
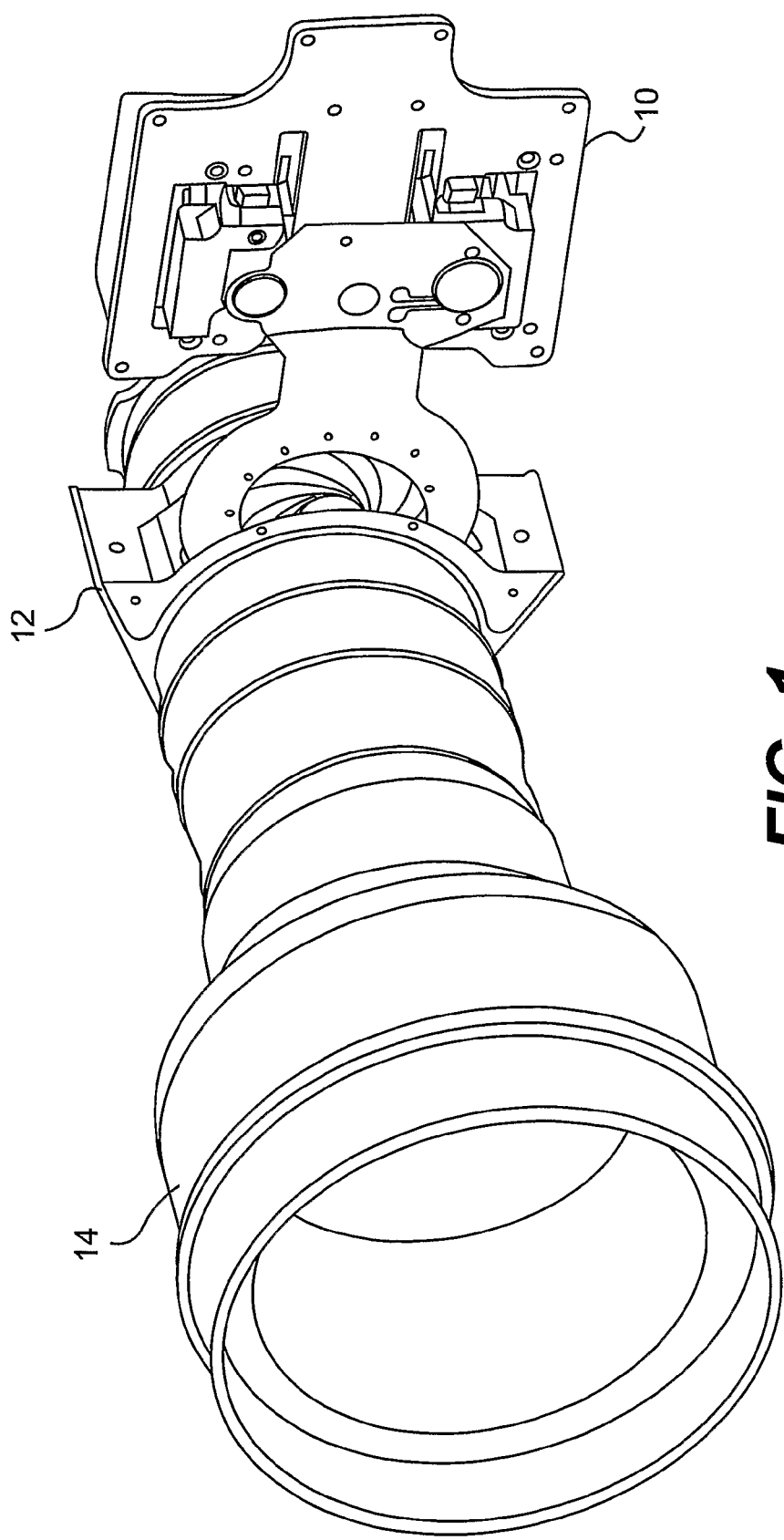
FIG. 1 provides a partial pictorial representation of an image capture device according to an exemplary disclosed embodiment.

The disclosed scanning device embodiments relate to systems and methods for moving various types of optical elements in a parallax scanning application or other image view position manipulation techniques (e.g., image segmentation). In one embodiment, the optical element may include a multi-leaf iris. This iris may include six or more leaf segments. In certain embodiments, the iris may include twelve or more leaf segments. Other types of optical elements may also be scanned using the presently disclosed system. For example, one or more lenses, mirrors, or prisms may be attached to the scanning device and moved according to a predetermined or desired scanning pattern.

As an overview of the structure and operation of an exemplary scanning device, linear actuators may be arranged parallel to one another on a base plate. These linear actuators may be attached to a pivoting armature that holds the optical element (e.g., the iris leaf mechanism). The iris, which is the payload of the scanning mechanism, may be linked to the actuators by two or more metal springs (e.g., flat metal springs). This arrangement provides an efficient and compact design. Pivoting and sliding linkages may be used in the scanning mechanism. Other types of mechanical linkage designs can and may be used and are only limited by the packaging requirements for a particular design and/or lens type. Optical position encoders, or other suitable encoding devices, may be used to provide position feedback related to the motion of the linear actuators and/or iris. One type of encoder incorporated into the scanning device includes a unit having a resolution of at least about 0.0001". These encoders may output a quadrature encoder signal and enable the use of a fully digital control system.

Various scan patterns may be generated with the disclosed scanning device. For the mechanism to drive the iris in a circle, for example, a position command signal from a computer controller or microprocessor, in the form of a sine wave, may be generated and sent to each actuator slightly phase shifted from each other. Due to the geometry of the mechanism, there may be a slight error in the scan, which may be ignored or, alternatively, corrected using software.

By controlling the motion of the linear actuators, the position of the iris may be precisely controlled, for example, in the X-Y plane (e.g. up and down and side to side when view with respect to the camera lens axis (e.g., normal to the camera lens axis)). Using the linear actuators, any desired scan pattern may be accomplished, including, for example, a circular scan pattern or a non-circular scan pattern. For purposes of this disclosure, a circular scan pattern may include any scan patterns that follow a path defined by the equation of a circle $(x^2+y^2=R^2)$. Circular, however, may also include elliptical scan patterns that approximate a circular pattern. More complex motion patterns are easily created using more complex drive waveforms. Basically, any suitable scan pattern may be generated using an appropriate combination of drive signals.

The scanning iris may be configured to slide into a lens system from the side allowing easy installation or removal. This feature may enable the use of the scanning iris system in certain commercially available camera lenses (e.g. "parallax scanning ready lenses"). It is possible, however, to use the scanning iris arrangement in a camera lens system specifically designed around the parallax scanning capability and associated mechanism.

One embodiment of the iris mechanism may include six or more blades to provide the iris shape. Another embodiment may include twelve or more blades. An appropriately designed spring may serve as a worm gear to drive the mechanism. The spring may provide backlash-free drive action and may be easier than traditional worm gear to fabricate at this scale.

The actuator drive system may include: two encoder processing boards, two servo drivers, and a small analog PID loop control board. In this configuration, the encoder boards may first condition the quadrature signals from the position scales. The position signals may then be fed to the PID control board that compares them to an input position command. The PID loop circuit can generate the position command signals using, for example, two sine wave generators. The above PID control may be done by either analog or digital circuitry, or a combination of both.

The iris mechanism for example may be driven by a very small brushless gear head motor (e.g., a motor made by Smoovy) and a suitable motor driver. The iris mechanism may also include an optical home sensor and an encoder to read its position. In this way, the scanning mechanism can operate as its own closed loop control system enabling high accuracy iris diameter control.

The scanner may operate to provide simple static (DC) positional control of the iris, or position the iris in a range of travel at scanning frequencies anywhere above DC to about 60 Hz. The upper frequency is a function of the drive type, i.e. electro-mechanical in this example, the design of the electromagnetic circuit, and the amount of power required to move the assembly. Other techniques such as those mentioned above, i.e. ferro-electric spatial light modulators, offer greater speeds and low input drive power.

The frequency and amplitude of the iris displacement away from the central axis of the lens may be determined by command parameters sent to the scanning controller. Because there should be some amount of clearance between the iris and the maximum lens aperture, the maximum available scan amplitude may be determined as a function of the iris setting. For example, a full aperture setting may allow little or even no scan for a certain lens type. On the other hand, a minimum aperture setting may offer the greatest potential scanning amplitude. The setting of the scan amplitude may be validated against a current iris setting to provide the desired maximum effect. The processor may determine the actual diameter of the iris via a lookup table and compare this diameter with a proposed scan setting to ensure that the settings are valid. An example relationship that illustrates an exemplary scan setting calculation includes:

Maximum scan setting=Max optical aperture−current aperture setting.

The following input parameters may be used for typical operation:
(1) focus position: direct position commands to the focus servo motor
(2) iris setting: direct commands to set the iris diameter
(3) scan amplitude: the amount of displacement from lens center
(4) scan period: the time period of the circular scan
(5) stop scan and start scan: turns the scanner on/off; and in most uses centers the iris when stopped.

A modular configuration may be used. A separate processor for "low level" control of the scanner may be housed along with the scanner mechanism, and a remote "high level" processor may run a user interface. The low level processor may house the mechanism, drive electronics, and processor and provide connections for user controls to control the scanner. The high level processor, which can be remotely mounted and wireless, can manage the user interface, allowing for elaborate displays, functions, and controls. This separation of the high and low level control functions may allow the mechanism and its drive electronics to remain as small and simple as possible.

The iris may have a leaf thickness of about 0.05 mm. Other thicknesses however, may be used depending on a particular design, configuration, or space available.

The disclosed scanning system and method will now be described in more detail as follows. Video and motion picture production equipment may include a camera, a lens operated by a view finder or a (video assist) monitor. The camera/lens can be controlled via a wired or wireless controller.

The disclosed optical element parallax scanning device may be included in any of the elements associated with video and motion picture production. For example, as illustrated in FIG. 1, the scanning device 10 may be configured for insertion or removal from an adapter 12 in a zoom lens 14, which may be associated with a camera (not shown).

Figure 2:
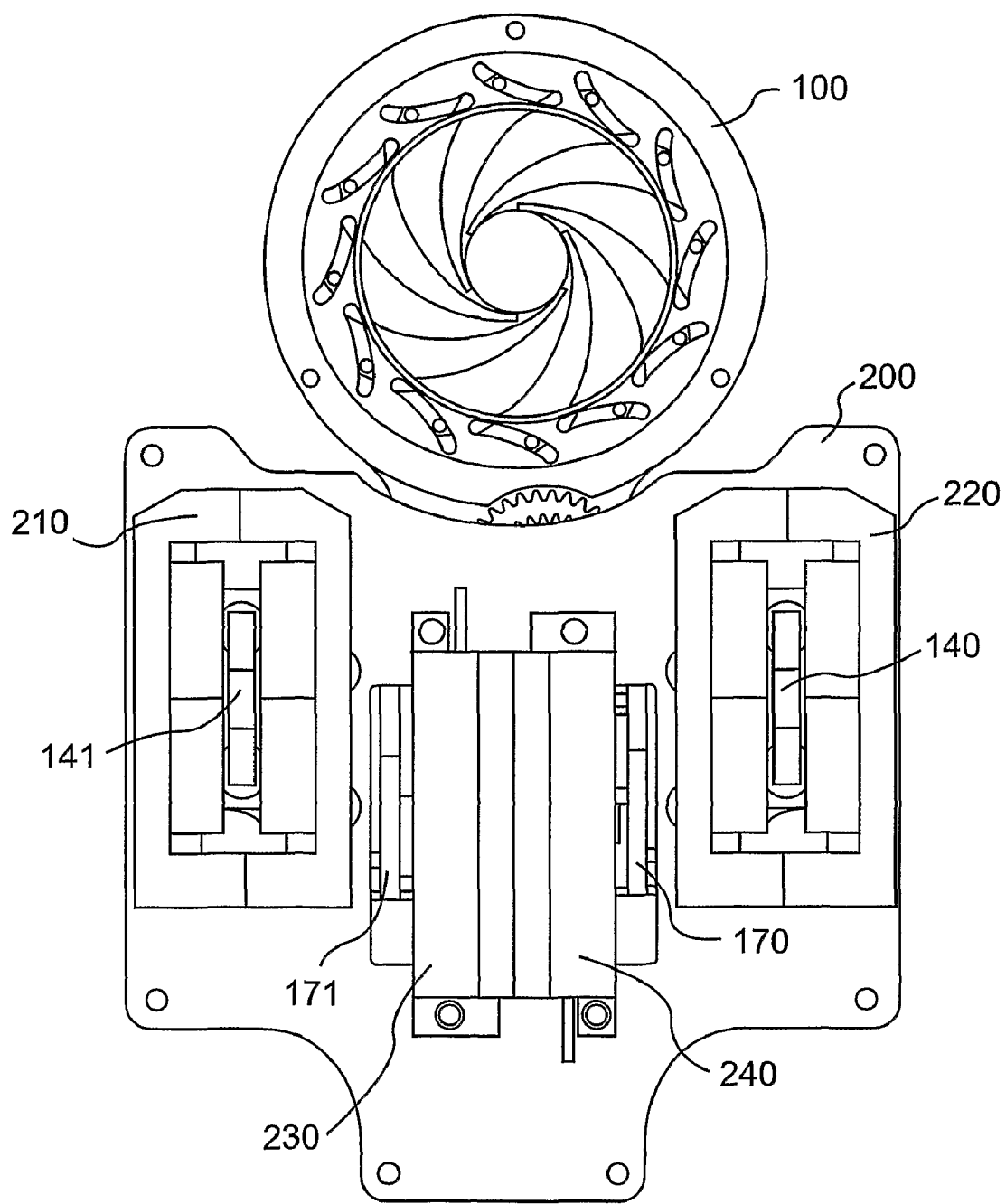
FIG. 2 provides a schematic, bottom view of an optical element scanning device according to an exemplary disclosed embodiment.

As shown in FIG. 2, the scanning unit may include a base plate 200, linear motors 210 and 220, and an iris assembly 100. Scanning device 10 may also include encoders 230 and 240 associated with linear motor 210 and linear motor 220, respectively. Further, encoders 230 and 240 may each include an encoder scale 171 and 170, respectively.

Figure 3:
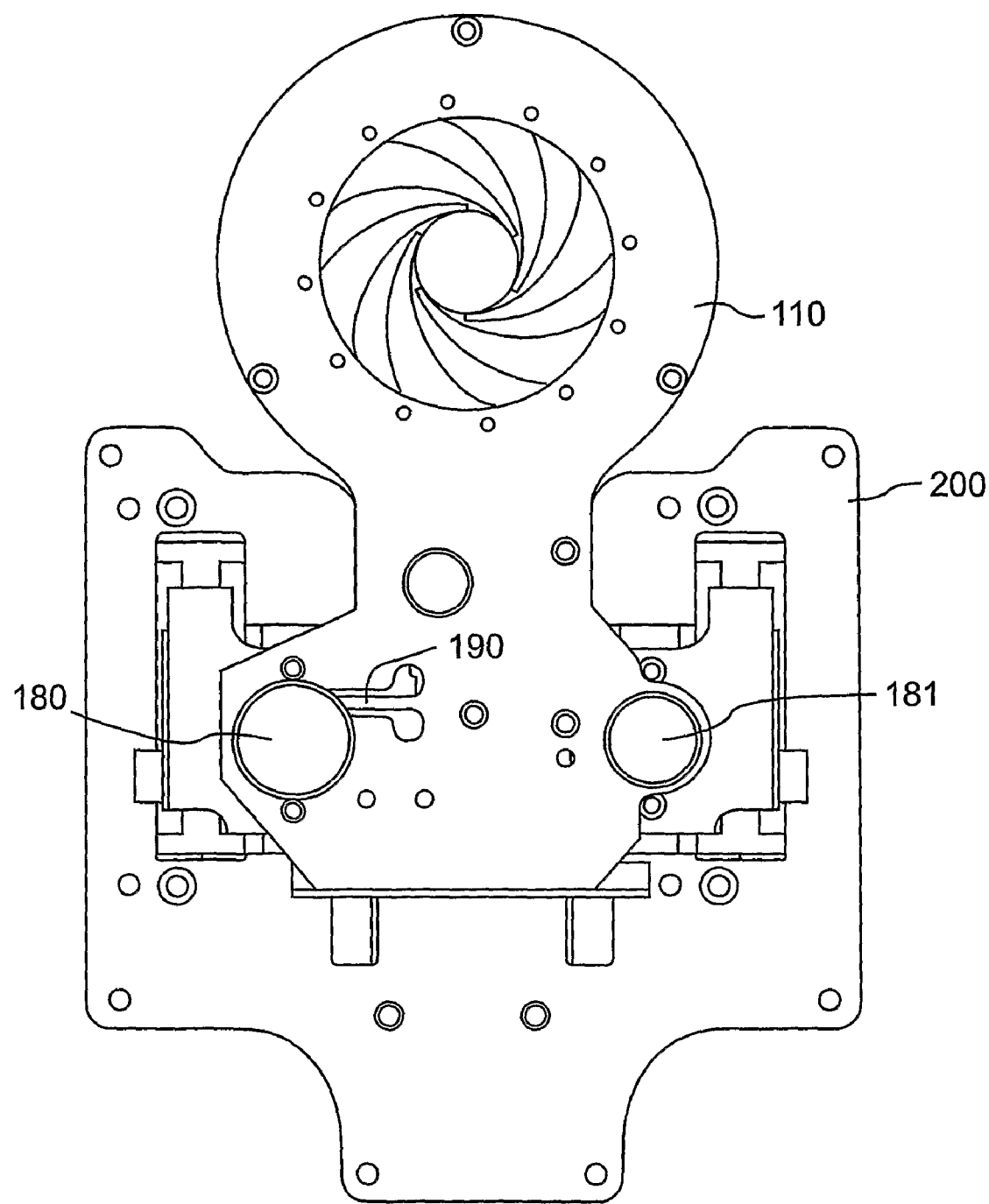
FIG. 3 provides a schematic, top view of an optical element scanning device according to an exemplary disclosed embodiment.

Iris assembly 100 may be mounted to a paddle 110 (i.e., an armature) that may be pivotably connected to base plate 200. To accomplish the pivotable connection, scanning device 10 may include a pivot 180, a pivot 181, and a pivot spring 190, as illustrated in FIG. 3. These elements enable paddle 110, and, therefore iris assembly 100, to move with respect to base plate 200.

One embodiment of the subject invention employs two linear actuators and a central pivoting armature that holds the iris. The two parallel linear actuators have coordinated motion in such a way as to produce both x and y motions of the iris. Shifting both of the linear actuators together in the same direction will cause at least some component of motion of the iris in the Y axis. Moving either linear actuator alone, or both actuators in opposite directions, will cause a component of motion in the X-axis. Controlling the coordinated motion of the linear actuators can provide any desired scan pattern of the iris over a range of motion in the X-Y plane.

Each linear actuator may include a moving coil and fixed magnetic yoke assembly. By incorporating miniature, high-resolution optical encoders, coil drivers, and a microcontroller, the entire scanner mechanism control system may be implemented as a fully digital system.

Figure 4:
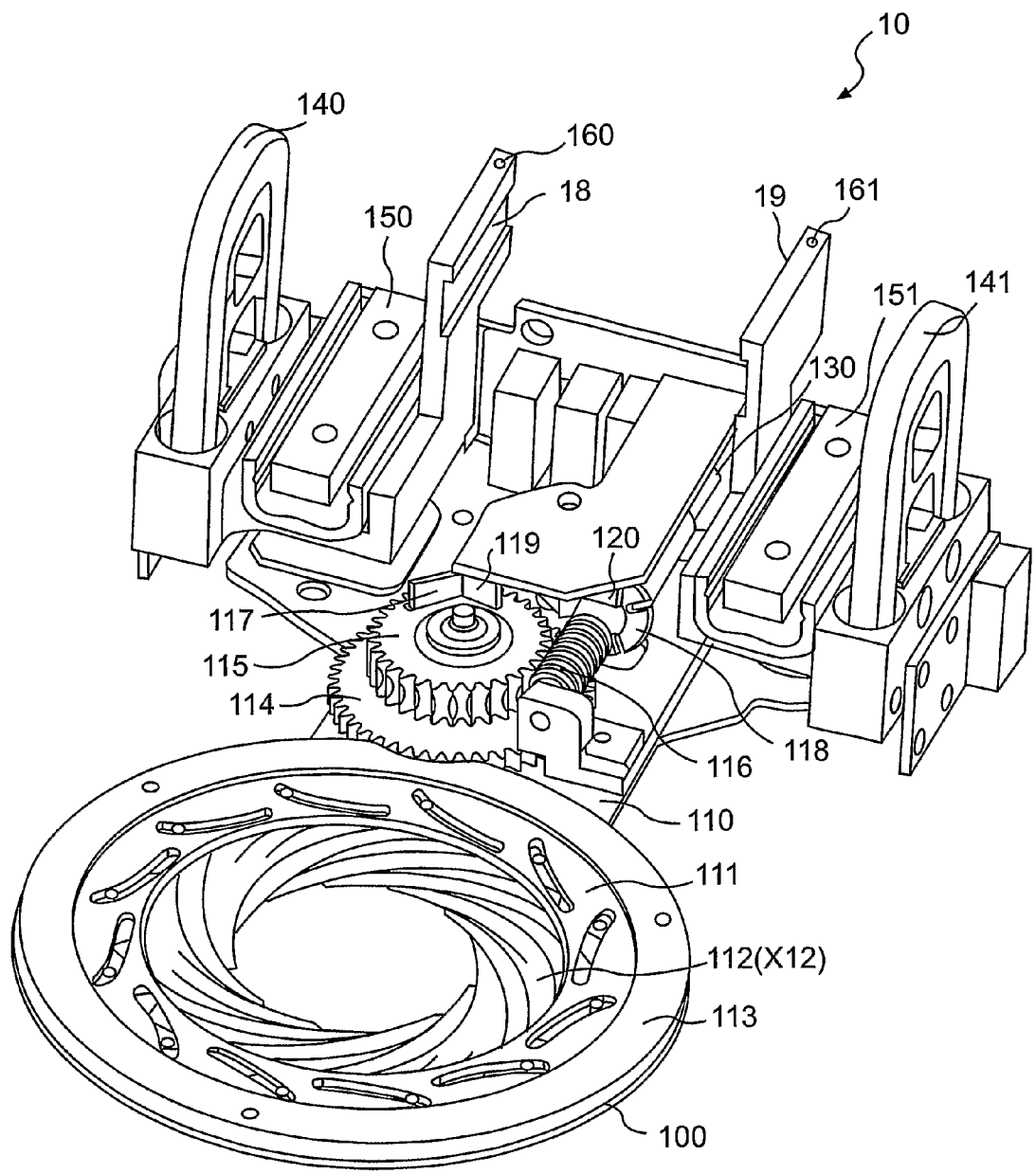
FIG. 4 provides a schematic, perspective view of an optical element scanning device according to an exemplary disclosed embodiment.

FIG. 4 provides a perspective view of optical element scanning device 10, which includes an iris assembly 100 having paddle 110 and iris leaves (12 leaves in this example) 112 sandwiched between paddle 110 and an iris cam ring 111. Each iris leaf 112 has a brass pin on each side that fits into slots in the iris cam ring 111 and holes in paddle 110. Iris cam ring 111 and leaves 112 are held in place by an iris guide ring 113. Any other type of iris device may be used depending on the needs of a particular application.

The iris may actuated by an iris drive gear 114. Iris drive gear 114 has attached to it an iris worm wheel gear 115, which may be driven by an iris worm gear 116. Iris worm gear 116 may be attached directly to a brushless DC gear motor 130 which provides the actuation force to open and close the iris under computer and operator control.

To achieve desired iris size control, a microcontroller may be used to both driver iris assembly 100 and sense values of parameters associated with its operation. An iris home flag 117 and an iris home sensor 119 may ensure the reference "start" position for accurate control. Each actuation pulse that drives brushless DC gear motor 130, and thus iris worm gear 114, may be monitored by an iris motor confidence flag 118 and an iris motor confidence sensor 120. This arrangement may allow for accurate iris/aperture control, and a desired level of repeatability.

In order to move iris assembly 100, iris mounting paddle 110 may be attached to a multi mount 160 and a multi mount 161 via a sliding pivot 180 and pivot 181 (FIG. 3). The pivots allow the paddle to move in both the X and Y axes, as described above. This motion enables the iris aperture to be positioned around an optical axis associated with a lens or other element of a camera or other device used to record an image or series of images.

During motion of scanning device 10, a sliding pivot bearing (not shown) slides against a cutout in mounting paddle 110 and is held under pressure by sliding pivot spring 190 to force motion along a path perpendicular to the linear motion of assembly 100. If an assembly is held by two pivots (or pins), the assembly may be fixed. To move the assembly, one of the pivots (e.g., sliding pivot 180) may allow for a small amount of precise motion. The pivots may be configured to transmit motion from multi mount 160 and multi mount 161 from coil 140 and coil 141. The pivots may also include slots 18 and 19 configured to accept encoder scale 170 and encoder scale 171 which may enable motion sensing. Multi mount 160 and multi mount 161 may allow linear motion via linear bearing 150 and linear bearing 151 and rotation motion via sliding pivot 180 and pivot 181. Linear bearing 150 and linear bearing 151 may also be attached to base plate 200 (FIG. 2). This allows base plate 200 to be held in place, while the mounting paddle 110 moves as needed.

Linear motor 210 and linear motor 220 may operate similar to other types of electromagnetic linear actuators. As an electrical current is passed through a coil, the coil responds by moving in a direction based on the magnetic north and south poles and the direction of current flow through the magnetic field the magnets create. The linear motion may be sensed by the previously mentioned encoder scale 170, encoder scale 171, linear encoder 230, and linear encoder 240, which also may be mounted to base plate 200.

The encoder and scale combination may have a resolution of about 100 lines per millimeter. The combination of a home/index pulse along with a quadrature pulse train from the encoders may allow for precise microcomputer control. The electronics control this part of the system in a PID control loop.

It should be noted that the motion of paddle 110 may not occur exactly along the X and Y axes. The Y axis may be linearly aligned parallel to linear motor 210 and linear motor 220 and, therefore, the motion along the Y axis may occur in a straight line. However, the X axis motion may occur along an arc, due to the pivoting nature of the assembly. A microcontroller, running a correction algorithm can alleviate this arc motion tendency and actually generate linear X axis motion.

The motor can be simplified as well as the iris drive train, to allow even greater miniaturization and streamlining. The use of alternate linear actuators like piezo-electric crystals or bimorph benders, are all capable of producing motion. In fact the microcontroller PID servo electronics may allow the use of various other types of motion devices and drive schemes to move the iris aperture using the X-Y pivot motion base.

The entire mechanism can be very small and compact, while being flexible enough to be adapted to a variety of video or film lenses. This allows the scanner to easily be placed in most existing lenses with little or no alteration, in part due to the thinness of the iris assembly. A simple mechanical mount that holds the scanner and mounts or attaches it to the lens (barrel) is the only portion that may need to be modified for each lens.

Software control functions may be implemented in a variety of ways. In one embodiment, servo drives operate in Pulse Width Modulation (PWM) mode using the processor's dual internal PWM modules. The PWM's may utilize two control lines each, Sign and PWM. The circuit could be based on the Microchip PIC 18F452 processor. The Microchip PIC 18F452 is a flash programmable chip that runs at 10 MIPS with an internal clock frequency of 40 MHZ, 32K program ROM, 1.5K RAM with a built-in 8×8 hardware multiplier. All servo algorithm calculations can be coded in an interrupt routine that can be periodically triggered by an internal timer. Software can be written in assembly, as needed, for speed. The system can be entirely digital, with the exception of supply voltage-sensing circuitry and/or external sensor inputs such as an analog accelerometer. The power supply can operate from 12VDC+−20%, 0.4 Amps max. Servo parameters can be stored as digital values for zero drift and 100% repeatability, unit to unit. The supply voltage can be measured at regular intervals and the servo loop gain(s) adjusted to compensate for variations. Command and control can occur via protocols like RS232 operating @ 38,400 baud.

Iris Positioning Servo System

The physical size of the iris aperture can be controlled in real time using the iris drive motor located on the moving iris paddle assembly. This motor is a three phase brushless DC gear-motor having a 25:1 ratio planetary gearset mounted on its output shaft. The motor is driven in step mode using a three phase bridge that is controlled by the processor. The bridge is powered from a bi-level drive scheme, the drive can supply a constant low current to the windings to hold the motor in position, or switch to a higher voltage when the motor moves, providing high output torque while avoiding thermal overheating while the motor is stationary for extended periods.

Iris Homing And Position Validation

The iris mechanism has two optical slotted interrupter switches that may be used to detect the mechanical positions of the iris mechanism. The iris home sensor detects the position of the main iris ring, providing an absolute position reference that is used during startup to position the iris and synchronize the processors internal position registers with the true mechanical position of the iris.

The iris confidence sensor provides validation of the motor shaft rotation. It may consist of a simple toothed wheel attached to the motor shaft that generates four pulses per revolution of the motor shaft. Because the motor may operate in a quasi open-loop mode, it is possible for the motor to become stalled and fail to rotate synchronously with the drive signals. The confidence sensor provides a means of verifying the motor rotation to ensure that the motor is operating correctly. The processor can monitor the confidence sensor input to validate that the incoming pulse edges correspond to the expected motor rotation. A primary task of the processor is to control the dual axis IRIS positioning servomechanisms. The actuators can consist of dual moving-coil actuators with incremental linear encoders providing quadrature position feedback. Encoder counts can be maintained by encoders like an LSI LSR7666R1 dual-axis quadrature counter to minimize processor overhead. A real-time, closed-loop PID algorithm implemented in software could be coded to control the servos in (Proportional, Integral, and Differential) with algorithm functions in position mode.

Lens Interface

Certain lenses that may be associated with the disclosed scanning device may operate in a substantially analog manner using analog voltages to communicate and control the absolute positions of the iris, zoom, and focus systems. The scanning unit may contain both an ADC and a DAC to allow it to interface with this analog hardware. The ADC can digitize the iris, zoom and focus voltages to allow them to be digitally processed. The ADC reference voltages may be set using a 4-channel DAC to allow the input voltage range to be digitally adjusted and calibrated. The DAC may also generate analog voltages to command the camera and lens to perform various functions using analog voltages.

Twin accelerometers can be mounted in the plane of the iris, on the main or daughter board, or could be used to provide an analog acceleration signal for image stabilization. The software may operate in two substantially different modes: mainline code and interrupt code. The mainline code may run in a substantially continuous manner, running in a constant repeating loop utilizing most of the CPU's instruction cycles.

The interrupt routine is intermittently triggered at a constant rate by a hardware timer built into the processor chip, this code interrupts the mainline code, performs time-sensitive functions and returns to the mainline code without disturbing its flow. The mainline code may execute constantly at a rate equal to or based on the speed of the CPU.

Command Parser Module

The command parser can act as a state machine that interacts with all system variables. It receives external user serial command strings via the serial port module and parses the strings into the different commands. Data embedded into the command string may be converted, checked and loaded into the appropriate variables to effect changes in system behavior—e.g. scan amplitude, frequency, iris opening etc.

Dual Sine Trajectory Generator

The mechanical architecture of the scanner may be used with linear actuators driven with two phase-shifted sine waves of variable frequency and amplitude. The time base uses a 16 bit internal timer (timer 0) running from the system clock as a programmable rate generator which is used to drive the two XY sine counters, these counters are used as pointers into a fixed sine data table that establishes the sinusoidal nature of the scan trajectory. The values fetched from this sine table are multiplied by scaling factors to alter the amplitude of scan. This arrangement can produce desired sine waves with fixed relative phase shift, while having a variable amplitude and frequency. The X and Y outputs of this module may be placed into the position command registers used to control the actuators, forcing the iris to follow a circular path.

Error Detection and Reporting System

Each software module in the system may contain code to detect invalid or erroneous operation of the physical electromechanical hardware, as well as invalid user inputs. The error detection system can monitor these systems and take appropriate actions to notify the user of the error condition. This may be done by creating an appropriate descriptive text string that is sent out the serial port module.

Interrupt Routine

An interrupt code may be executed every 320 microseconds (or other specified time) as commanded by another internal hardware timer. This timing may ensure that the code is executed at a constant rate so that time sensitive aspects of the PID algorithm and motor control systems are serviced correctly.

PID Code, X and Y Axis

Both axes may be serviced sequentially. On each cycle, the positions of each encoder may be read from the LS7266 dual channel encoder counter chip and compared against (a) the desired actuator position register and (b) the position of the encoder on the last cycle. These two error parameters may be used in Proportional, Integral, and Derivative servo position control algorithms to control the actuators, causing them to physically follow the values in the position command registers.

Iris Indexer Module

The iris motor indexer may output a three-phase waveform that drives the motor either CW or CCW in step-mode. The indexer software can maintain the absolute position of the motor and calculate the desired number of waveform steps required to drive the motor to an absolute commanded position.

AD Converter Module

The AD converter system constantly digitizes multiple analog voltages. The AD module handles multiplexing, acquisition and conversion of these voltages to 10 bits of accuracy.

It will be apparent to those skilled in the art that various modifications and variations can be made in the disclosed optical element parallax scanning device without departing from the scope of the disclosure. Additionally, other embodiments of the disclosed systems and methods will be apparent to those skilled in the art from consideration of the specification. It is intended that the specification and examples be considered as exemplary only, with a true scope of the disclosure being indicated by the following claims and their equivalents.

What is claimed is:

1. An optical element scanning device, comprising:
a base plate;
a first linear actuator and a second linear actuator operably connected to the base plate, wherein the first linear actuator and the second actuator operate together to scan an optical element over a range of motion in an X-Y plane;
an armature pivotably connected to the first and second linear actuators;
the optical element operably connected to the armature; and
a processor configured to supply electrical signals to the first and second linear actuators for controlling movements of the first and second linear actuators, wherein the electrical signals supplied by the processor cause the optical element to move with a scanning frequency of between 0 Hz and 60 Hz.

2. The optical element scanning device of claim 1, wherein the optical element includes an iris.

3. The optical element scanning device of claim 2, wherein the iris includes at least six leaves.

4. The optical element scanning device of claim 1, wherein the optical element includes at least one of a lens, a mirror, or a prism.

5. The optical element scanning device of claim 1, further including:
at least one encoder associated with the one or more linear actuators;
wherein the electrical signals supplied by the processor are based, at least in part, on an output of the at least one encoder.

6. The optical element scanning device of claim 1, wherein the one or more linear actuators include a resolution of at least 0.0001 inches.

7. The optical element scanning device of claim 1,
wherein the optical element includes an iris; and
a maximum scan amplitude over the range of motion is determined based on a difference between a maximum optical aperture of the iris and a selected optical aperture setting for the iris.

8. The optical element scanning device of claim 1, wherein the first and second linear actuators move the optical element in a circular pattern in the X-Y plane.

9. An imaging device, comprising:
a housing;
at least one lens operably connected to the housing; an image capture medium configured to receive light conveyed through the at least one lens;
an optical element disposed in the housing of the imaging device at a position that enables the optical element to affect the light received by the image capture medium, wherein the optical element is operably connected to an armature that is pivotably connected to a first linear actuator and to a second linear actuator, and the first and second linear actuators are configured to move the optical element through a range of motion in an X-Y plane; and
a processor configured to supply electrical signals to the first and second linear actuators for controlling the motion of the optical element in the X-Y plane, wherein the electrical signals supplied by the processor cause the optical element to move with a scanning frequency of between 0 Hz and 60 Hz.

10. The imaging device of claim 9, wherein the first and second linear actuators are configured to move the optical element in a circular pattern in the X-Y plane.

11. The imaging device of claim 9, further including:
at least one encoder associated with the first and second linear actuators;
wherein the electrical signals supplied by the processor are based, at least in part, on an output of the at least one encoder.

12. The imaging device of claim 9, wherein the image capture medium includes film.

13. The imaging device of claim 9, wherein the image capture medium includes a CCD.

14. The imaging device of claim 9, wherein optical element includes an iris.

15. The imaging device of claim 9, wherein optical element includes at least one of a lens, a mirror, or a prism.

16. The imaging device of claim 9, wherein the optical element, the first and second linear actuators, and the armature are operably connected together as part of a single unit configured to be removable from the imaging device.

17. A method of capturing an image, comprising:
transferring light through at least one lens to an image capture medium;
controlling an amount of light received by the image capture medium with one or more optical elements; and
scanning the one or more optical elements over a range of motion in an X-Y plane and about an optical axis of the at least one lens, wherein scanning includes providing electrical signals to a first linear actuator and a second actuator to pivot an armature operably connected to the one or more optical elements,
wherein the electrical signals cause the one or more optical elements to move with a scanning frequency of between 0 Hz and 60 Hz.

18. The method of claim 17, wherein positions of the first and second actuators are monitored using at least one encoder.

19. The method of claim 17, wherein the electrical signals are provided by a processor-based device.

20. The method of claim 17, wherein scanning further includes moving the one or more optical elements in a circular pattern in the X-Y plane.

21. An imaging device, comprising:
a housing;
at least one lens operably connected to the housing;
an image capture medium configured to receive light conveyed through the at least one lens; and
an optical element comprising an iris, wherein the optical element is disposed in the housing of the imaging device at a position that enables the optical element to affect the light received by the image capture medium;
wherein the optical element is operably connected to an armature that is pivotably connected to a first linear actuator and to a second linear actuator, and the first and second linear actuators are configured to move the optical element through a range of motion in an X-Y plane.

* * * * *